US006788943B1

(12) United States Patent
Hämäläinen et al.

(10) Patent No.: US 6,788,943 B1
(45) Date of Patent: Sep. 7, 2004

(54) CHANNEL ALLOCATION IN THE BASE STATIONS OF A CELLULAR RADIO SYSTEM

(75) Inventors: Seppo Hämäläinen, Espoo (FI); Oscar Salonaho, Helsinki (FI); Niina Laaksonen, Espoo (FI); Antti Lappeteläinen, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 913 days.

(21) Appl. No.: 09/154,100

(22) Filed: Sep. 16, 1998

(30) Foreign Application Priority Data

Sep. 17, 1997 (FI) .................................................. 973719

(51) Int. Cl.[7] .................................................. H04Q 7/20
(52) U.S. Cl. ........................ 455/450; 455/509; 455/512; 455/435.3
(58) Field of Search ................................. 455/450, 509, 455/512, 513, 517, 452, 435, 452.1, 435.1, 435.2, 435.3; 370/341, 342, 347, 348; 375/145, 142

(56) References Cited

U.S. PATENT DOCUMENTS

| 3,806,838 | A | * | 4/1974 | Kitazume | 333/136 |
|---|---|---|---|---|---|
| 5,263,176 | A | * | 11/1993 | Kojima et al. | 455/512 |
| 5,349,632 | A | * | 9/1994 | Nagashima | 455/435 |
| 5,491,741 | A | * | 2/1996 | Farwell et al. | 370/347 |
| 5,504,939 | A | * | 4/1996 | Mayrand et al. | 455/450 |
| 5,533,013 | A | * | 7/1996 | Leppanen | 370/342 |
| 5,666,655 | A | * | 9/1997 | Ishikawa et al. | 455/512 |
| 5,752,193 | A | * | 5/1998 | Scholefield et al. | 455/452 |
| 5,768,345 | A | * | 6/1998 | Takebe et al. | 455/464 |
| 5,794,156 | A | * | 8/1998 | Alanara | 455/517 |
| 5,903,848 | A | * | 5/1999 | Takahashi | 455/512 |
| 5,920,591 | A | * | 7/1999 | Fukasawa et al. | 375/142 |
| 6,023,623 | A | * | 2/2000 | Benkner et al. | 455/452 |

FOREIGN PATENT DOCUMENTS

| DE | 19625856 A1 | 9/1997 |
|---|---|---|
| EP | 0637895 A3 | 2/1995 |
| EP | 0684744 A2 | 4/1995 |
| WO | WO 95/07013 | 3/1995 |
| WO | WO 97/15995 | 5/1997 |
| WO | WO 97/30528 | 8/1997 |
| WO | WO 97/32440 | 9/1997 |

OTHER PUBLICATIONS

Finnish Official Action.

* cited by examiner

*Primary Examiner*—Sonny Trinh
(74) *Attorney, Agent, or Firm*—Perman & Green, LLP (57) ABSTRACT

The base station of a cellular radio system is in radio communication with the mobile stations of the cellular radio system by using mutually essentially orthogonal channels. In order to control the use of the channels, said channels are divided into groups with different priorities, so that the base station uses primarily the channel group with the highest priority. Channels belonging to different priority groups are put to use in a selective manner as a response to the loading of the base station.

11 Claims, 4 Drawing Sheets

CHANNEL ALLOCATION IN THE BASE STATIONS OF A CELLULAR RADIO SYSTEM

TECHNOLOGICAL FIELD

The invention relates to how the base station in a cellular radio system allocates the frequencies, time slots and/or spreading codes available on a radio interface for the connections that need data transmission capacity between mobile stations and the base station. The invention also relates to how the allocation of the frequencies, time slots and/or spreading codes is coordinated in such base stations of the cellular radio system that are located near to each other.

BACKGROUND OF THE INVENTION

A central factor in the planning of a cellular radio system is how to prevent such radio transmissions that take place in adjacent cells from interfering with each other. For instance, in a GSM (Global System for Mobile telecommunications) system, transmission and reception take place at 200 kHz wide frequency bands, the number of which is 124 in both directions. The frequency bands, or frequencies in short, are allocated for the base stations so that adjacent base stations are not allowed to use the same frequencies. The allocation of frequencies to base stations is called frequency planning, and the resulting division of the use of frequencies is called a reuse pattern. There can be defined a frequency reuse factor, which describes how far it is necessary to go from the present cell until there is found a cell at the same frequency as in the present cell. The larger the frequency reuse factor, the smaller the part of all possible frequencies that can be used in one single cell. In order to allocate frequencies in GSM and many other second-generation digital cellular radio systems, there is applied TDMA, Time Division Multiple Access, according to which a given frequency is divided into cyclically repeated time slots inside the cell. Thus one and the same frequency can accommodate several active connections inside the cell (in GSM the number is eight).

In cellular radio systems base on CDMA, Code Division Multiple Access, the transmission frequency can be the same in all cells, so that the transmissions are separated from each other by using mutually orthogonal or nearly orthogonal spreading codes. Now the above mentioned frequency planning is replaced by code planning, according to which given spreading codes are appointed for the use of the cells, so that the same codes must not be used in adjacent cells.

In third-generation digital cellular radio systems, the transmission and reception in the interface between the base station and the mobile stations is arranged in frames consisting of a variable number of slots with variable sizes. The quantity of the data transmission capacity represented by each slot is determined by the duration of the slot in question, the slot width in the frequency direction and possibly the spreading code used in the slot. From the point of view of sharing resources, the frequencies and codes in second-generation systems, as well as the slots in third-generation systems, can all be called orthogonal channels, or channels in short.

Systems based on a fixed channel reuse pattern are inflexible with respect to momentary variations in the traffic situation. If several mobile terminals are momentarily concentrated in one cell, for instance due to some mass activity, the channels allocated for said cell may run out. At the same time, there may be unused capacity in the adjacent cell, but because the coverage area of the base station of the adjacent cell does not extend as far as the heavily loaded area, the unused channels cannot be utilised.

It is possible to provide a system where adjacent cells or cells located near to each other could "lend" unused capacity for a loaded cell. This, however, requires remarkable signalling in between the base stations, because the base stations must inform each other both of the need and availability of channels, and also be prepared to handover situations, where part of the mobile terminals of the loaded cell may move over to exactly that cell where the channels were reduced by lending them to the use of the most loaded cell.

SUMMARY OF THE INVENTION

It is an object of the present invention to provide a method and system whereby the channel allocation in the base stations of a cellular radio system can be carried out in a flexible manner. Another object of the invention is to provide a method which requires only slight signalling between the base stations.

The objects of the invention are achieved by dividing the channels allocated for each base station to priorised groups, and by taking channels or channel groups into use in the priorised order according to the demand.

The method according to the invention for controlling the use of channels in a cellular radio system base station which is in radio communication with the mobile terminals of the cellular radio system by using mutually essentially orthogonal channels is characterised in that when said channels are divided into groups with different priorities, the base station uses primarily the channel group with the highest priority.

The invention also relates to a cellular radio system characterised in that it is provided, in at least one base station, means for recording the information of the cellular radio system channels as divided into priority groups, as well as means for selectively putting to use channels from different priority groups as a response to the loading of the base station.

According to the invention, the channels allocated for each base station are divided into priorised groups. Highest in the priority order of a single base station are the channels that are as low as possible in the priority order of other base stations located in the vicinity. When the load is slight, each base station uses the channels highest in priority, so that the channel reuse factor is high and interference between cells is low. When the load increases, the base stations put to use, in addition to the channels already in use, channels that are located lower in the priority order, so that the channel reuse factor on the system level decreases. Now the possibility of interference between cells grows, but its effect can be evened out by applying frequency hopping and/or time hopping. When the load again decreases, the base stations return to use only the channels that are highest in the priority order.

BRIEF DESCRIPTION OF THE DRAWINGS

The invention is explained in more detail below, with reference to a few preferred embodiments presented by way of example, and to the appended drawings, where.

Like numbers for like parts are used in the drawings.

DETAILED DESCRIPTION OF THE INVENTION

FIGS. 1a–1d are schematical illustrations of the cells in a simple cellular radio system. For the sake of clarity, the cells 101–109 are illustrated as regular-shaped, mutually tangential hexagons; in real cellular radio systems, the cells are less precise in shape, and their location in relation to each other is more irregular. In FIGS. 1a–1d it is assumed that the operator responsible for the operation of the cellular radio system has three available channels, which are channels 1, 2 and 3. For all cells in the cellular radio system there are defined certain channels that are divided into so-called priority groups. The division of the channels into n priority groups can be described by a so-called preference matrix PV, which consists of n column vectors $p_i$, i∈[1, n] i.e. PV=[$p_1$, $p_2$, ... $p_n$]. For the sake of clarity, the preference matrices are not illustrated in FIGS. 1a–1d. The column vector $p_1$ located farthest on the left-hand side of the preference matrix PV contains channels belonging to the first priority group, i.e. the symbols of those channels that are highest in the priority order of said cell. The next column vector $p_2$ contains the channels belonging to the second priority group, and so on. The channels indicated by the column vector $p_n$ located farthest on the right hand side are lowest in the priority order of the cell in question.

The vertical dimension of the preference matrix, i.e. the number of the elementary units contained in the preference matrix, is as large as the largest number of channels found in any of the priority groups. If each priority group contains only one channel, the preference matrix can be a 1×n matrix. If the largest number of channels contained in one priority group is m, the preference matrix is a m×n matrix.

Figure 1A:
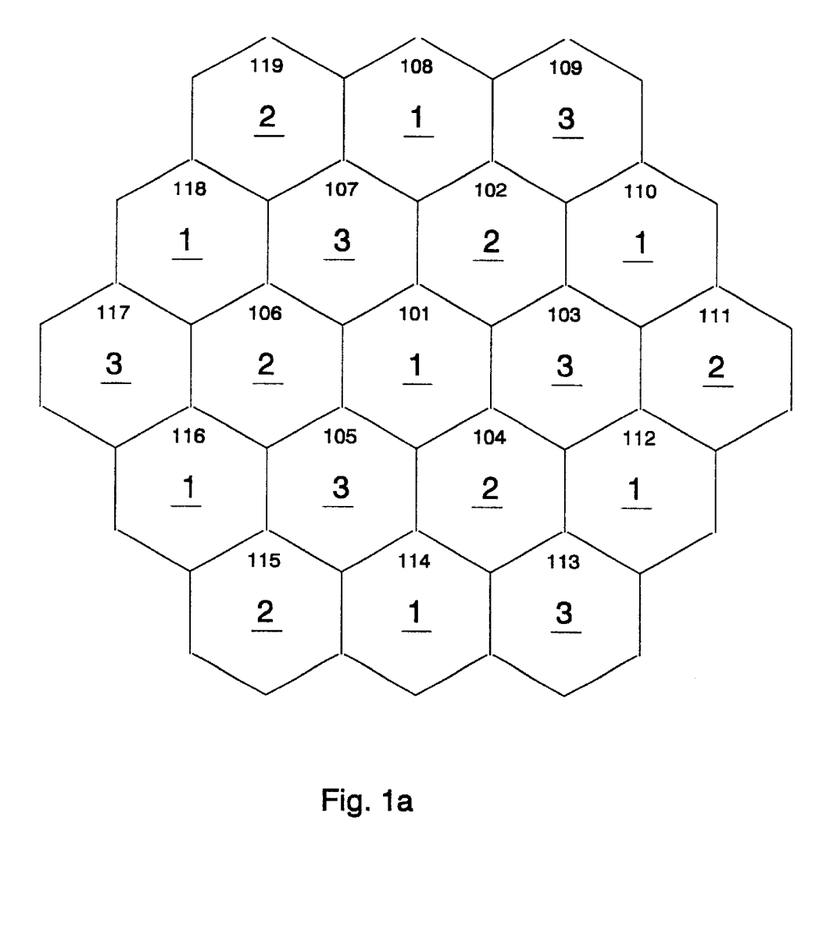
FIG. 1a illustrates the cells in a cellular radio system during a slight load.
Figure 1B:
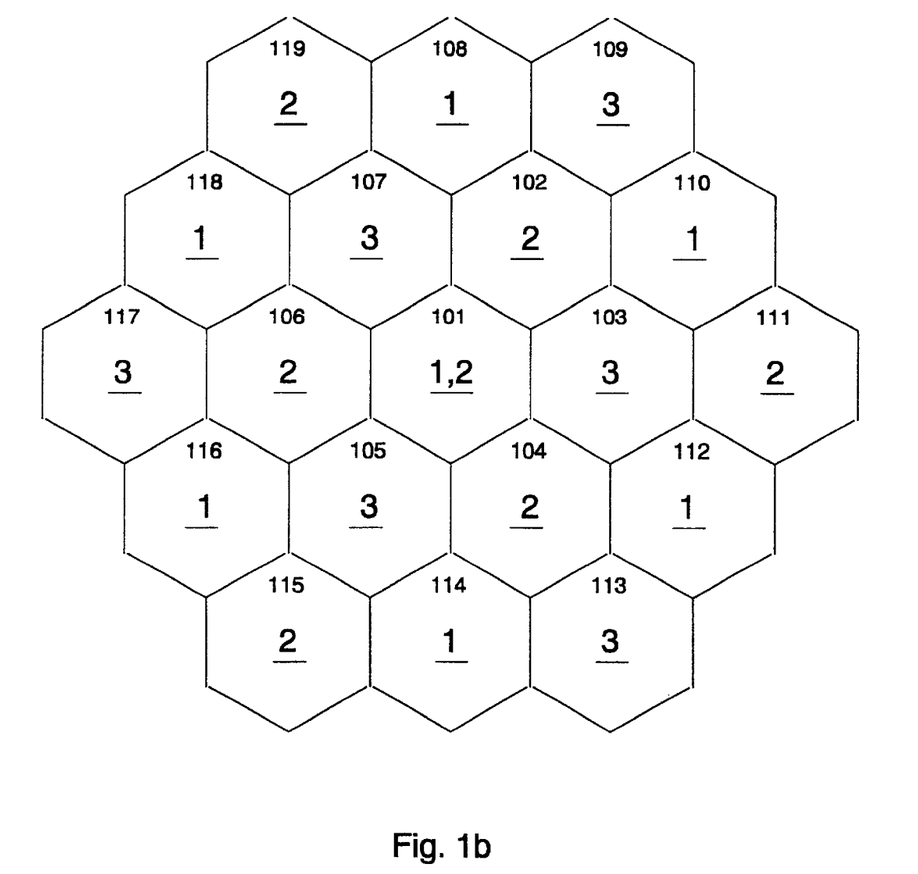
FIG. 1b illustrates the cellular radio system of FIG. 1a in another load situation.
Figure 1C:
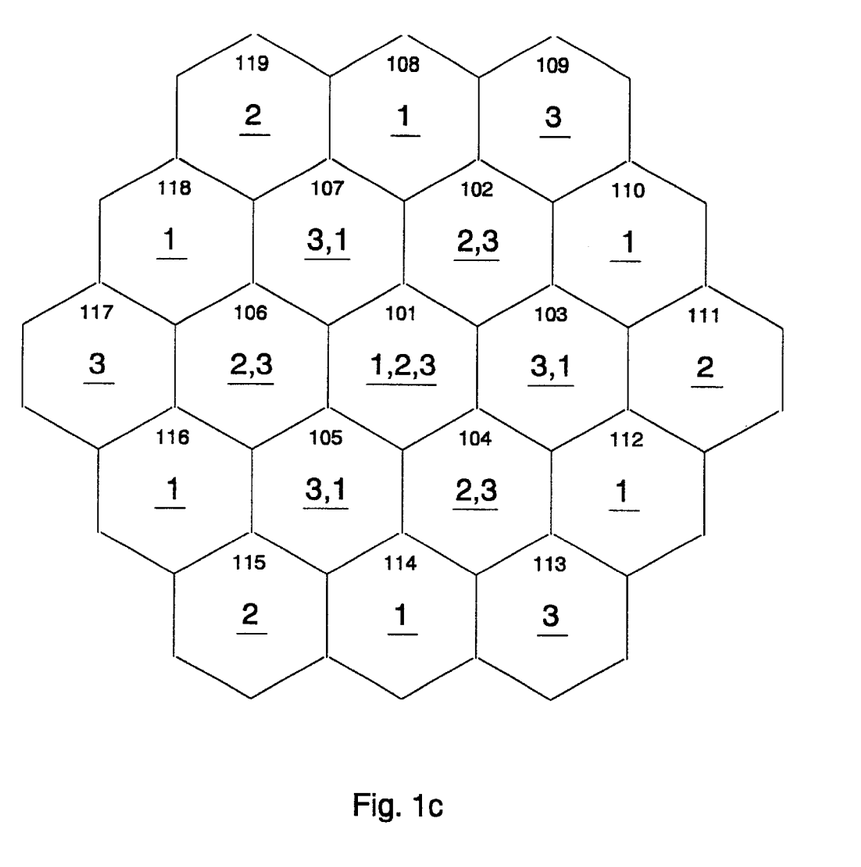
FIG. 1c illustrates the cellular radio system of FIG. 1a in a third load situation.

FIGS. 1a–1c illustrate a cellular radio system where the preference matrices are 1×3 matrices, so that in each of the three priority groups, there is only one channel, and respectively in each column vector, there is only one elementary unit. In FIG. 1a, the load is slight throughout the network. In the cells 101, 108, 110, 112, 114, 116 and 118, only channel 1 is being used, which means that in the preference matrix of these cells, the column vector located farthest on the left-hand side is [1]. Respectively, in the preference matrix of the cells 102, 104, 106, 111, 115 and 119, the column vector located farthest on the left-hand side is [2], and in the preference matrix of the cells 103, 105, 107, 109, 113 and 117, the column vector located farthest on the left-hand side is [3]. In FIG. 1b it is assumed that the load in the middle cell 101 increases, in which case this cells puts to use the channels belonging to the second priority group. In this case the second priority group only contains the channel 2, i.e. the second column vector of the preference matrix is [2]. As the load further increases and is distributed in a wider area, we end up in the situation illustrated in FIG. 1c. In FIG. 1c, in the most heavily loaded cell 101 also the channel 3 belonging to the third priority group is put to use, and in the cells 102–107, there also is put to use the channel belonging to the second priority group of each cell.

On the basis of FIGS. 1a–1c, it can be concluded that the preference matrices of the cells are as follows:

cells 101, 108, 110, 112, 114, 116 and 118: PV=[1 2 3]
cells 102, 104, 106, 111, 115 and 119: PV=[2 3 1]
cells 103, 105, 107, 109, 113 and 117: PV=[3 1 2].

Figure 1D:
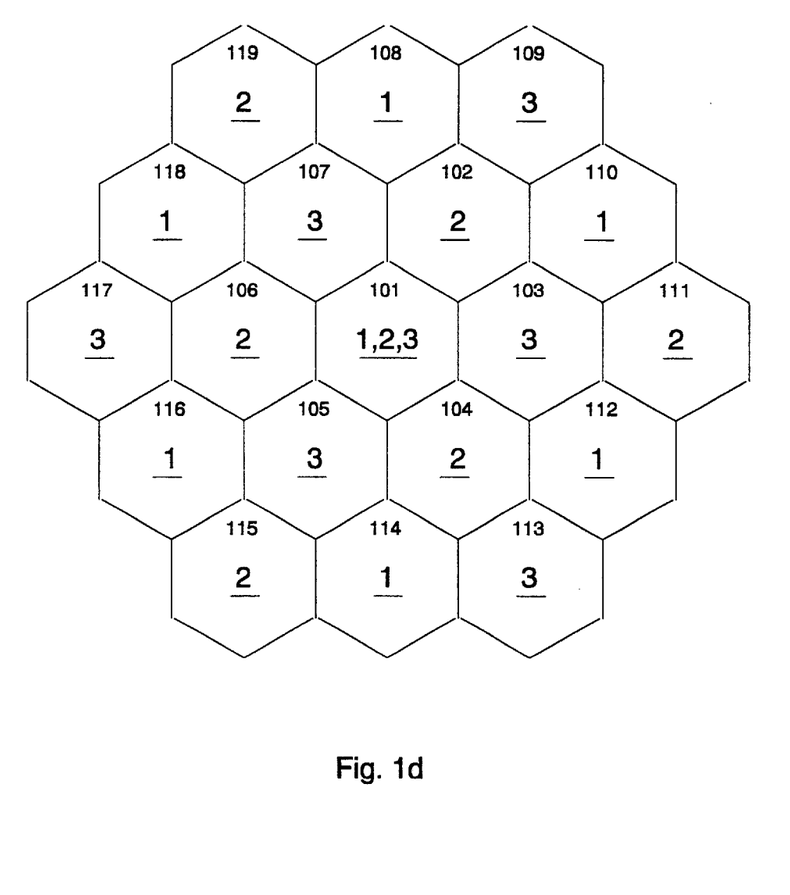
FIG. 1d illustrates an alternative procedure in the situation according to FIG. 1b.

FIG. 1d illustrates an alternative procedure in a situation corresponding to FIG. 1b. In FIG. 1d, among the channels of each cell, there is one channel in the first priority group, and two channels in the second priority group. Now the preference matrices can be as follows:

cells 101, 108, 110, 112, 114, 116 and 118: $PV = \begin{bmatrix} 1 & 2 \\ 0 & 3 \end{bmatrix}$ cells 102, 104, 106, 111, 115 and 119: $PV = \begin{bmatrix} 2 & 1 \\ 0 & 3 \end{bmatrix}$ cells 103, 105, 107, 109, 113 and 117: $PV = \begin{bmatrix} 3 & 1 \\ 0 & 2 \end{bmatrix}$.

When the preference matrices are presented in the above described manner, it is pointed out that the matrix element 0 does not signify channel number zero (here we assume that such a channel is not even defined) but it means empty.

As an example of a somewhat more complex system, let us observe a cellular radio system with 16 channels available for the use of the operator. There are formed 16 different preference matrices, and the cells are divided into 16 groups, so that all cells belonging to the same group have the same preference matrix. By applying methods known from conventional frequency planning, the cells belonging to different groups are arranged so that the distance between two cells belonging to the same group is as long as possible. The first column vector of each preference matrix contains only one channel, so that with cells belonging to the first group, the column vector located farthest on the left-hand side is [1 0 0 0 0 0 0 0]$^T$, with cells belonging to the second group [2 0 0 0 0 0 0 0]$^T$ and so on. If in each cell, only the channel belonging to the first priority group is being used, the channel reuse factor is 16. Also the second priority group contains only one channel in each cell. If all cells put to use also this channel belonging to the second priority group, the channel reuse factor drops to 8. The third priority group contains two channels in each cell, the fourth priority group four channels and the fifth priority group eight channels. If all cells use channels of the three first priority groups, the channel reuse factor is 4. If all cells use channels of the four first priority groups, the channel reuse factor is 2. If all channels are being used in all cells, the channel reuse factor is 1.

One preference matrix in the above described 16-channel system could be as follows:

$$PV = \begin{bmatrix} 1 & 9 & 5 & 3 & 2 \\ 0 & 0 & 13 & 7 & 4 \\ 0 & 0 & 0 & 11 & 6 \\ 0 & 0 & 0 & 15 & 8 \\ 0 & 0 & 0 & 0 & 10 \\ 0 & 0 & 0 & 0 & 12 \\ 0 & 0 & 0 & 0 & 14 \\ 0 & 0 & 0 & 0 & 16 \end{bmatrix}$$

For a man skilled in the art it is obvious how other preference matrices are constructed, so that adjacent cells contain as few of the same channels as possible, when all channels are not in use.

In third-generation cellular radio systems, the channels correspond to the slots of the frame structure used at a given frequency in transmission and reception. Adjacent or superimposed cells can use the same frequency, if the influence of inter-cellular interference is reduced by slot allocation and time and frequency hopping. According to one possible arrangement, the frame structure to be used at one frequency can have no more than 64 slots. In addition, the frames can be combined to superframes having the length of a few frames, so that the reservation of slots takes place superframe by superframe. If there may also be several frequencies in use, the total number of the channels rises easily very large and can be for instance 512 channels. The preference matrix may include even tens of lines and columns. In order to prevent the preference matrix from becoming too complicated, in a preferred embodiment of 512 slots, the slots are divided into four priority groups, the first of which contains 64 slots, the second 64 slots, the third 128 slots and the fourth 256 slots. Some of the slots are reserved for transmitting information needed for the system maintenance, for instance for transmitting a certain downlink BCCH channel (Broadcast Control Channel).

The condition for a situation when more channels are put to use in a given cell, or when the number of currently used channels can respectively be reduced, can be defined in many different ways. One alternative is to measure how large a share of the data transmission capacity offered by the currently used channels is reserved. Let us assume that channels are frequencies, and that at each frequency, there is applied time division multiple access. Now at one frequency, there can at a time be transmitted a certain number of active connections, for instance eight connections in the GSM system, because the GSM frame contains eight time slots, each of which can be reserved for a different connection. When in a given cell the base station detects that at the currently used frequencies, the number of vacant time slots decreases below a given first threshold value, the base station puts to use the frequencies belonging to the next priority group. Respectively, when the base station in a cell detects that that at the frequencies in use, the number of vacant time slots increases above a given second threshold value, the base station removes from use the frequencies belonging to the lowest priority group in use. The suitable threshold values can be found by simulation and trial. The number of the channels in the uplink and downlink directions need not be equal. Channel activation and deactivation based on the reserved capacity is easily generalised from the above described arrangements based on frequencies and time slots to arrangements where the channels are defined in some other way.

Another possible condition depends on the transmission power that the base station and/or mobile stations use on the channels that are being used in the cell. In a downlink transmission, the base station measures how high is the average power, total power and/or peak power that it uses when transmitting on the currently used channels. If any of the measured power values, for instance the total downlink transmission power per channel, is higher than a given first threshold power, the base station puts more channels to use in the downlink direction. Respectively, if any of the measured power values is lower than a given second threshold power, the base station removes from use the downlink channels belonging to the lowest currently used priority group. By means of simulation and trial it can be found out which measured power value is best suited as the criteria for decision-making, and which are the suitable threshold powers. In order to be able to follow the same procedure in the uplink transmission, the base station must know the frequency at which the mobile stations included in its cell transmit. In order to transmit this information from the mobile stations to the base station, there can be employed signalling known as such.

When the load in the network is slight, only a few channels are being used in the cells functioning according to the invention. This reduces the possibilities to use hopping between the channels (for instance frequency hopping, when the channels are frequencies) for eliminating the effects of interference occurring in some channels. On the other hand, now the channel reuse factor is at highest, and the interference carried from one cell to another is at lowest. Moreover, for example in the TDMA arrangement based on frequencies, there can be applied time hopping, although the number of frequencies were only one. The more channels there are available in a cell, the better the chances to apply any of the known channel hopping algorithms for avoiding channelwise interference. The use of time and frequency hopping is advantageous also because it increases the diversity of the channel, i.e. it evens out interference. In addition, there can be applied cyclic hopping between cells, which means that the cells exchange the currently used channels between them. Cyclic hopping can be realised so that the column vectors located farthest on the left-hand side in the preference matrix, or some vectors starting from the left-hand side, are exchanged between the base stations. For example in the situation of FIG. 1, this means that those base stations (those cells) where the column vector, located farthest on the left-hand side of the preference matrix, is [1], put to use, instead of this matrix, the column vector [2]; those that originally had [2] as the column vector located farthest on the left-hand side, put to use the column vector [3], and those that originally had [3] as the column vector located farthest on the left-hand side, put to use the column vector [1]. After a given period, said exchange process is repeated. This requires a fairly good synchronisation between the base stations.

The preference matrix can also be utilised in capacity division inside the cell; there the base station decides which of the capacity units being used (slots, frequencies and/or codes) are allocated for the active connections. The channels contained in the highest priority groups, i.e. in the column vectors located farthest on the left-hand side in the preference matrix, are those with probably lowest detected interference caused by other cells. Accordingly, these channels can be reserved for such connections that are defined as the most important by means of some known mechanism. For instance, the base station can transmit connections demanding both real-time and non-real-time data transmission. The connections based on real-time data transmission do not allow error correction by retransmission, wherefore they can be placed in channels assumed to have the least interference. On the other hand, mobile stations located in the periphery of the cell are more susceptible to interference carried from the adjacent cell, so that they can also be "favoured" by directing them to use the channels contained in the highest priority groups. In order to maintain channel diversity, in a system applying channel hopping it is not favourable to restrict the most important connections to only the channel or channels contained in the highest priority group, but their channel hopping algorithms should be planned so that they use more of the channels contained in the highest priority groups than of the rest of the channels.

In the above description, we have mainly explained how channels are allocated between the base stations in a cellular radio system. Let us next observe an advantageous procedure that can be applied in a base station for reserving channels for bearers, i.e. for placing active connections in those channels that are being used in the cell of said base station. Here 'bearer' means the unit formed by all such factors that affect the data transmission between the base station and a given mobile station. The concept 'bearer' includes, among others, data transmission rate, delay, bit error ratio and the variations occurring in these in between given minimum and maximum values. The bearer can be understood as the data transmission path created by all these factors, which data transmission path connects the base station and a given mobile station, and through it can be transmitted useful data, i.e. payload information. One bearer always connects only one mobile station to one base station. Multifunctional mobile stations can simultaneously maintain several bearers that connect the mobile station to one or several base stations.

An algorithm which in the base station is responsible for placing the present and future bearers in the slots of the frame structure is called the CA (Channel Allocation) algorithm. It maintains a reservation table describing the reservation situation of the frame structure slots in the uplink and downlink directions. The selection of slots can be restricted by the fact that the fragmentation of the frame structure is attempted to be minimised, i.e. in the frame structure, a given amount of relatively uniform areas is attempted to be kept vacant, which areas can, when necessary, be reserved as one high-capacity slot to the use of a connection with a broader bandwidth than the rest. Moreover, many mobile stations set restrictions as to how near to each other the slots reserved for them can be located in the frame structure, and how the uplink and downlink slots to be reserved for one and the same mobile station should be synchronised in relation to each other.

In order to facilitate the operation of the CA algorithm, it is assumed that a given importance or priority value can be defined for each connection. One feature affecting the priority value of a connection is the fact whether the connection requires real-time or non-real-time data transmission. Typically the connections requiring real-time data transmission, i.e. RT (Real Time) connections, are considered more important than NRT (Non Real Time) connections. The RT connections are attempted to be located seemingly at random in the vacant slots of the frame structure, bearing in mind the minimisation of fragmentation and other possible restricting factors. The NRT connections are placed in the slots that are left vacant by the RT connections.

Each NRT connection sends for the CA algorithm, for the duration of the successive frame or superframe, a request for obtaining slots. The number of requested slots depends, among others, on the quantity of NRT data to be transmitted, on the applied channel coding, modulation method and interleaving depth, as well as on the restrictions that the base station or mobile station sets to the largest possible quantity of data to be processed at a time. The CA algorithm can classify the active NRT connections according to what is their true active bitrate so far, said bitrate being defined for example as a ratio of the bits that were successfully transmitted over the radio interface to the time during which transmittable NRT data existed in said connection. In reserving slots, the purpose is now to favour those NRT connections where the true data transmission rate was lowest in relation to the data transmission demand and possibilities. In addition, the CA algorithm may favour such NRT connections that use a transmission power as low as possible, because their interference load caused for the system is lowest. Furthermore, a CA algorithm may favour such NRT connections for which there has been guaranteed a minimum rate for data transmission while setting up the connection.

The CA algorithm conforms to the following principles:

1. The updating of the reservation situation begins by processing those requests that request the release of a given capacity.

2. In time and frequency hopping, there is applied a given minimum unit, for instance a $\frac{1}{16}$ frame size unit.

3. In order to prevent fragmentation, the large slots in the frame structure (for example slots of the size of a $\frac{1}{16}$ frame), part of which is already filled with smaller, reserved slots (for example $\frac{1}{64}$ frame size slots) are attempted to be filled completely before reserving capacity from such slots of the same size that are still left totally unreserved.

4. RT connections have higher priority than NRT connections.

5. New RT connections are attempted to be placed in such slots that are vacant. If a suitable vacant slot is not found, the RT connection is placed in a slot which up till now was reserved for some NRT connection.

6. Such NRT connections that were guaranteed a minimum data transmission rate while setting up the connection but which have difficulty in maintaining said minimum rate have higher priority than other NRT connections.

7. The quantity of simultaneous active NRT connections is limited, in order to prevent the signalling load from excessive growing.

8. In the priorisation of connections, attention should be paid to whether the connections transmit such bearers that are mutually related, for instance belong to the same user.

An advantageous method for maintaining the reservation situation in the frame structure is explained in the Finnish patent application No. 964,308 and in the corresponding U.S. patent application No. 802,645, which was filed on Feb. 19, 1997.

On the hardware level the invention requires that the base station is provided with means for recording the data regarding the channels of the cellular radio system and their division into priority groups, as well as means for putting to use a necessary number of channels and means for realising the CA algorithm maintaining the reservation situation in the frame structure. In addition to this, the invention requires that both the mobile stations and the base stations are provided with means by which the mobile station can send requests for reserving channels and the base station can inform the mobile station as to which channels are reserved for it. Likewise, the base station must be able to transmit for the mobile station the information of the details of the operation mode being used at each particular time, for instance of how the frequency and time hopping is realised. In such embodiments that require a change in the transmission power, the base stations and mobile stations must naturally have means for measuring the current transmission power. The hardware-level requirements can be realised by means of known microprocessor-controlled facilities, by programming them to function in a manner required by the invention.

What is claimed is:

1. A method for controlling the use of channels in first and second proximately disposed base stations of a cellular radio system, which base stations are in radio communication with the mobile stations of the cellular radio system by using mutually essentially orthogonal channels, said method comprising the steps of:

dividing said channels into groups, each group having a priority that is different from the priorities of the other groups, said first base station having a selected channel group with a highest priority, said second base station having a selected channel group with a highest priority, said selected channel groups not being the same in said first and second base stations, under a first set of operational conditions, using in a certain base station the channels belonging to the group with the highest priority, and under a second set of operational conditions, using in said certain base station the channels belonging to the groups with lower priority.

2. A method according to claim 1, wherein said first set of operational conditions corresponds to a low load at said base station and said second set of operational conditions corresponds to a higher load at said base station, so that when the load at said base station increases, the base station puts to use, in addition to the channels already in use, the unused channel group that has the highest priority among the unused channel groups.

3. A method according to claim 2, wherein the criteria for an increase or decrease in the load is the reservation situation of the data transmission capacity represented by the currently used channels, so that when it is observed that of said data transmission capacity, there is reserved a proportion that is larger than a given first threshold value, the base station puts to use, in addition to the currently used channels, also the unused channel group that has the highest priority among the unused channel groups, and when it is observed that of said data transmission capacity, there is reserved a proportion that is smaller than a given second threshold value, the base station stops the use of the channels in the channel group that has the lowest priority among the used channel groups.

4. A method according to claim 2, wherein the criteria for an increase or decrease in the load is the transmission power in the currently used channels, so that when it is observed that the transmission power is higher than a given first threshold power, the base station puts to use, in addition to the currently used channels, also the unused channel group that has the highest priority among the unused channel groups, and when it is observed that the transmission power is lower than a given second threshold power, the base station stops the use of the channels in the channel group that has the lowest priority among the used channel groups.

5. A method according to claim 1, wherein said first set of operational conditions corresponds to a low load at said base station and said second set of operational conditions corresponds to a higher load at said base station, so that when the load at said base station decreases, the base station stops the use of the used channel group that has the lowest priority among the used channel groups.

6. A method according to claim 1, wherein the base station also divides the data transmission capacity represented by the channels already in use between the active connections, so that the connections requiring real-time data transmission have privilege to the data transmission capacity over the connections requiring non-real-time data transmission.

7. A multiple access cellular radio system that comprises:
a plurality of base stations having contiguous cells;
at least in first and second proximately disposed base stations means for recording the information of the cellular radio system channels as divided into priority groups, each priority group having a priority that is different from the priorities of the other groups;
said first base station having a selected channel group with a highest priority;
said second base station having a selected channel group with a highest priority;
said selected channel groups not being the same in said first and second base stations; and
said first and second base stations including: means for selectively putting to use channels from one priority group under a first set of operational conditions and additionally channels from another priority group under a second set of operational conditions.

8. A method for controlling the use of channels in the base station of a cellular radio system, which base station is in radio communication with the mobile stations of the cellular radio system by using mutually essentially orthogonal channels, said method comprising the steps of:
dividing said channels into groups, each group having a priority that is different from the priorities of the other groups,
under a first set of operational conditions, using in a certain base station the channels belonging to the group with the highest priority,
under a second set of operational conditions, using in said certain base station the channels belonging to the groups with lower priority,
wherein said first set of operational conditions corresponds to a low load at said base station and said second set of operational conditions corresponds to a higher load at said base station, so that when the load at said base station increases, the base station puts to use, in addition to the channels already in use, the unused channel group that has the highest priority among the unused channel groups,
wherein the criteria for an increase or decrease in the load is the reservation situation of the data transmission capacity represented by the currently used channels, so that when it is observed that of said data transmission capacity, there is reserved a proportion that is larger than a given first threshold value, the base station puts to use, in addition to the currently used channels, also the unused channel group that has the highest priority among the unused channel groups, and when it is observed that of said data transmission capacity, there is reserved a proportion that is smaller than a given second threshold value, the base station stops the use of the channels in the channel group that has the lowest priority among the used channel groups.

9. A method for controlling the use of channels in the base station of a cellular radio system, which base station is in radio communication with the mobile stations of the cellular radio system by using mutually essentially orthogonal channels, said method comprising the steps of:
dividing said channels into groups, each group having a priority that is different from the priorities of the other groups,
under a first set of operational conditions, using in a certain base station the channels belonging to the group with the highest priority,
under a second set of operational conditions, using in said certain base station the channels belonging to the groups with lower priority,
wherein said first set of operational conditions corresponds to a low load at said base station and said second set of operational conditions corresponds to a higher load at said base station, so that when the load at said base station increases, the base station puts to use, in addition to the channels already in use, the unused channel group that has the highest priority among the unused channel groups, and
wherein the criteria for an increase or decrease in the load is the transmission power in the currently used channels, so that when it is observed that the transmission power is higher than a given first threshold power, the base station puts to use, in addition to the currently used channels, also the unused channel group that has the highest priority among the unused channel groups, and when it is observed that the transmission power is lower than a given second threshold power, the base station stops the use of the channels in the channel group that has the lowest priority among the used channel groups.

10. A method for controlling the use of channels in the base station of a cellular radio system, which base station is in radio communication with the mobile stations of the cellular radio system by using mutually essentially orthogonal channels, said method comprising the steps of:

dividing said channels into groups, each group having a priority that is different from the priorities of the other groups, under a first set of operational conditions, using in a certain base station the channels belonging to the group with the highest priority, under a second set of operational conditions, using in said certain base station the channels belonging to the groups with lower priority, wherein said first set of operational conditions corresponds to a low load at said base station and said second set of operational conditions corresponds to a higher load at said base station, so that when the load at said base station decreases, the base station stops the use of the used channel group that has the lowest priority among the used channel groups, and wherein the criteria for an increase or decrease in the load is the reservation situation of the data transmission capacity represented by the currently used channels, so that when it is observed that of said data transmission capacity, there is reserved a proportion that is larger than a given first threshold value, the base station puts to use, in addition to the currently used channels, also the unused channel group that has the highest priority among the unused channel groups, and when it is observed that of said data transmission capacity, there is reserved a proportion that is smaller than a given second threshold value, the base station stops the use of the channels in the channel group that has the lowest priority among the used channel groups.

11. A method for controlling the use of channels in the base station of a cellular radio system, which base station is in radio communication with the mobile stations of the cellular radio system by using mutually essentially orthogonal channels, said method comprising the steps of:

dividing said channels into groups, each group having a priority that is different from the priorities of the other groups, under a first set of operational conditions, using in a certain base station the channels belonging to the group with the highest priority, under a second set of operational conditions, using in said certain base station the channels belonging to the groups with lower priority, wherein said first set of operational conditions corresponds to a low load at said base station and said second set of operational conditions corresponds to a higher load at said base station, so that when the load at said base station decreases, the base station stops the use of the used channel group that has the lowest priority among the used channel groups, and wherein the criteria for an increase or decrease in the load is the transmission power in the currently used channels, so that when it is observed that the transmission power is higher than a given first threshold power, the base station puts to use, in addition to the currently used channels, also the unused channel group that has the highest priority among the unused channel groups, and when it is observed that the transmission power is lower than a given second threshold power, the base station stops the use of the channels in the channel group that has the lowest priority among the used channel groups.

* * * * *